(12) United States Patent
Giori et al.

(10) Patent No.: US 8,574,714 B2
(45) Date of Patent: Nov. 5, 2013

(54) METHOD OF MANUFACTURING AN ENGRAVED PLATE

(75) Inventors: Fausto Giori, Lausanne (CH); Dirk Dauw, Vinzel (CH); Jacques Perrier, Commugny (CH); Laurent Mathys, Plan-les-Ouate (CH)

(73) Assignee: KBA-Giori S.A., Lausanne (CH)

( * ) Notice: Subject to any disclaimer, the term of this patent is extended or adjusted under 35 U.S.C. 154(b) by 643 days.

(21) Appl. No.: 12/378,544

(22) Filed: Feb. 17, 2009

(65) Prior Publication Data

US 2009/0223927 A1 Sep. 10, 2009

Related U.S. Application Data

(62) Division of application No. 10/487,026, filed on Feb. 17, 2004, now Pat. No. 8,230,786.

(30) Foreign Application Priority Data

Jun. 5, 2002 (EP) .................................... 02405452

(51) Int. Cl.
- *G03G 13/26* (2006.01)
- *B44C 1/22* (2006.01)
- *B32B 27/16* (2006.01)
- *G03F 7/00* (2006.01)
- *B41C 1/02* (2006.01)
- *B41C 1/05* (2006.01)

(52) U.S. Cl.
USPC .......... 428/408; 428/577; 430/49.1; 430/302; 430/307; 101/150; 101/463.1; 101/465; 264/400; 264/446; 264/482

(58) Field of Classification Search
USPC .......... 219/121.68, 121.69, 121.85; 428/408, 428/577; 430/49.1, 302, 307; 101/150, 101/463.1, 465; 264/400, 446, 482
See application file for complete search history.

(56) References Cited

U.S. PATENT DOCUMENTS

| | | | | |
|---|---|---|---|---|
| 2,604,388 A | * | 7/1952 | Staehle | 430/274.1 |
| 3,204,557 A | * | 9/1965 | Wolbert | 101/492 |
| 3,622,742 A | | 11/1971 | Cohen et al. | |
| 3,664,737 A | * | 5/1972 | Lipp | 355/18 |
| 3,781,816 A | | 12/1973 | Coleman et al. | |
| 3,970,781 A | * | 7/1976 | Dalton et al. | 358/480 |

(Continued)

FOREIGN PATENT DOCUMENTS

| | | |
|---|---|---|
| CN | 1299723 A | 6/2001 |
| DE | 2354323 A1 | 5/1974 |

(Continued)

OTHER PUBLICATIONS

A catalog issued by Kabushiki Haisha Technologic, an English translation attached, unknown publication date.

(Continued)

*Primary Examiner* — Samuel M Heinrich
(74) *Attorney, Agent, or Firm* — Krieg DeVault LLP; Clifford W. Browning

(57) ABSTRACT

A method of manufacturing an engraved plate used in intaglio printing, said plate being engraved by a tool, for example a laser beam, characterized in that the engraving tool uses data from a depth-map, based on a three-dimensional raster image of the document to be printed.

9 Claims, 11 Drawing Sheets

(56) References Cited

U.S. PATENT DOCUMENTS

| | | | | |
|---|---|---|---|---|
| 4,131,782 | A | 12/1978 | Einstein et al. | |
| 4,245,260 | A | 1/1981 | Doelves | |
| 4,300,970 | A * | 11/1981 | Honda et al. | 156/244.11 |
| 4,447,833 | A | 5/1984 | Sano et al. | |
| 4,504,354 | A | 3/1985 | George et al. | |
| 4,568,412 | A | 2/1986 | Atkins et al. | |
| 4,947,016 | A | 8/1990 | Puyplat | |
| 4,965,698 | A | 10/1990 | Thoma et al. | |
| 4,970,600 | A | 11/1990 | Garnier et al. | |
| 5,051,312 | A * | 9/1991 | Allmer | 428/458 |
| 5,117,299 | A | 5/1992 | Kondo et al. | |
| 5,151,719 | A | 9/1992 | Akutsu et al. | |
| 5,152,861 | A | 10/1992 | Hann | |
| 5,201,027 | A * | 4/1993 | Casini | 358/1.7 |
| 5,327,167 | A | 7/1994 | Pollard et al. | |
| 5,329,381 | A | 7/1994 | Payne | |
| 5,435,247 | A | 7/1995 | Giori et al. | |
| 5,519,724 | A | 5/1996 | Tatah | |
| 5,525,573 | A | 6/1996 | Uemura et al. | |
| 5,528,390 | A * | 6/1996 | Goto et al. | 359/12 |
| 5,551,341 | A | 9/1996 | Lewis et al. | |
| 5,719,009 | A | 2/1998 | Fan | |
| 5,798,202 | A | 8/1998 | Cushner et al. | |
| 5,804,353 | A | 9/1998 | Cushner et al. | |
| 5,828,464 | A | 10/1998 | Yoshida et al. | |
| 5,891,986 | A | 4/1999 | Yamaguchi et al. | |
| 5,952,429 | A | 9/1999 | Ikeda | |
| 5,985,419 | A * | 11/1999 | Schlueter et al. | 428/195.1 |
| 6,007,318 | A | 12/1999 | Russell et al. | |
| 6,070,527 | A | 6/2000 | Yamane et al. | |
| 6,143,470 | A | 11/2000 | Nguyen et al. | |
| 6,158,345 | A | 12/2000 | Gelbart | |
| 6,167,206 | A | 12/2000 | Hylen | |
| 6,180,325 | B1 | 1/2001 | Gelbart | |
| 6,214,276 | B1 | 4/2001 | Gelbart | |
| 6,262,436 | B1 | 7/2001 | Nakata | |
| 6,283,029 | B1 * | 9/2001 | Tashiro et al. | 101/455 |
| 6,393,687 | B1 | 5/2002 | Friedrich | |
| 6,462,307 | B1 | 10/2002 | Hennig et al. | |
| 6,523,467 | B2 | 2/2003 | Fangmeyer et al. | |
| 6,537,479 | B1 | 3/2003 | Colea | |
| 6,540,453 | B1 | 4/2003 | Lübcke | |
| 6,558,876 | B1 * | 5/2003 | Fan | 430/306 |
| 6,586,501 | B1 | 7/2003 | Dalton et al. | |
| 6,609,459 | B1 | 8/2003 | Figov | |
| 6,694,264 | B2 | 2/2004 | Grace | |
| 6,746,814 | B2 | 6/2004 | Coe | |
| 6,811,858 | B1 | 11/2004 | Mayer et al. | |
| 6,840,721 | B2 | 1/2005 | Kaule et al. | |
| 6,888,853 | B1 | 5/2005 | Jürgensen | |
| 6,928,925 | B1 | 8/2005 | Mayer et al. | |
| 6,947,178 | B2 | 9/2005 | Kuo | |
| 6,964,227 | B2 | 11/2005 | Franz et al. | |
| 7,252,239 | B2 | 8/2007 | Braun | |
| 8,088,560 | B2 * | 1/2012 | Williamson | 430/302 |
| 2001/0043842 | A1 | 11/2001 | Kaule et al. | |
| 2002/0051894 | A1 | 5/2002 | Yoshikawa | |
| 2002/0054109 | A1 | 5/2002 | Ogino et al. | |
| 2002/0085247 | A1 | 7/2002 | Xu et al. | |
| 2002/0100691 | A1 | 8/2002 | Bonivert et al. | |
| 2002/0135745 | A1 | 9/2002 | Fischer et al. | |
| 2003/0043270 | A1 | 3/2003 | Rafey et al. | |
| 2003/0180646 | A1 | 9/2003 | Asano et al. | |
| 2004/0007145 | A1 | 1/2004 | Franz et al. | |
| 2004/0025728 | A1 | 2/2004 | Adamczyk | |
| 2004/0086156 | A1 | 5/2004 | Furukawa et al. | |

FOREIGN PATENT DOCUMENTS

| | | | |
|---|---|---|---|
| DE | 2709554 A1 | 9/1977 | |
| DE | 2719275 A1 | 11/1977 | |
| DE | 19952598 C1 | 10/2000 | |
| DE | 10044403 | 3/2002 | |
| DE | 10044403 A1 | 3/2002 | |
| EP | 0322301 | 6/1989 | |
| EP | 0 741 486 A1 | 11/1996 | |
| EP | 0976551 A1 * | 5/2000 | |
| EP | 1 152 296 A1 | 11/2001 | |
| GB | 1410518 | 10/1975 | |
| GB | 1567698 | 5/1980 | |
| GB | 2087796 A * | 6/1982 | |
| JP | 03106693 A * | 5/1991 | |
| JP | 405217711 A | 8/1993 | |
| JP | 06293191 | 10/1994 | |
| JP | 07-276837 | 10/1995 | |
| JP | 09-272254 | 10/1997 | |
| JP | 10-044363 | 2/1998 | |
| JP | 3504074 | 3/1998 | |
| JP | 3141506 | 12/2000 | |
| JP | 2001-105166 | 4/2001 | |
| JP | 2001121833 A * | 5/2001 | |
| JP | 2002-510570 | 4/2002 | |
| JP | 3351900 | 9/2002 | |
| JP | 3504074 | 3/2004 | |
| RU | 2132280 C1 | 6/1999 | |
| WO | WO 95/31332 A1 | 11/1995 | |
| WO | WO 9626466 | 8/1996 | |
| WO | WO9626466 A1 * | 8/1996 | |
| WO | WO 97/48555 | 12/1997 | |
| WO | WO 00/13839 A1 | 3/2000 | |
| WO | WO 00/20216 A1 | 4/2000 | |
| WO | WO 00/20217 A1 | 4/2000 | |
| WO | WO 01/62509 A1 | 8/2001 | |
| WO | WO 0220268 A1 | 3/2002 | |
| WO | WO 0220279 A1 | 3/2002 | |

OTHER PUBLICATIONS

Kipphan, Helmut et al., Handbuch der Printmedien, Springer Verlag 2000 (No English Translation available).

* cited by examiner

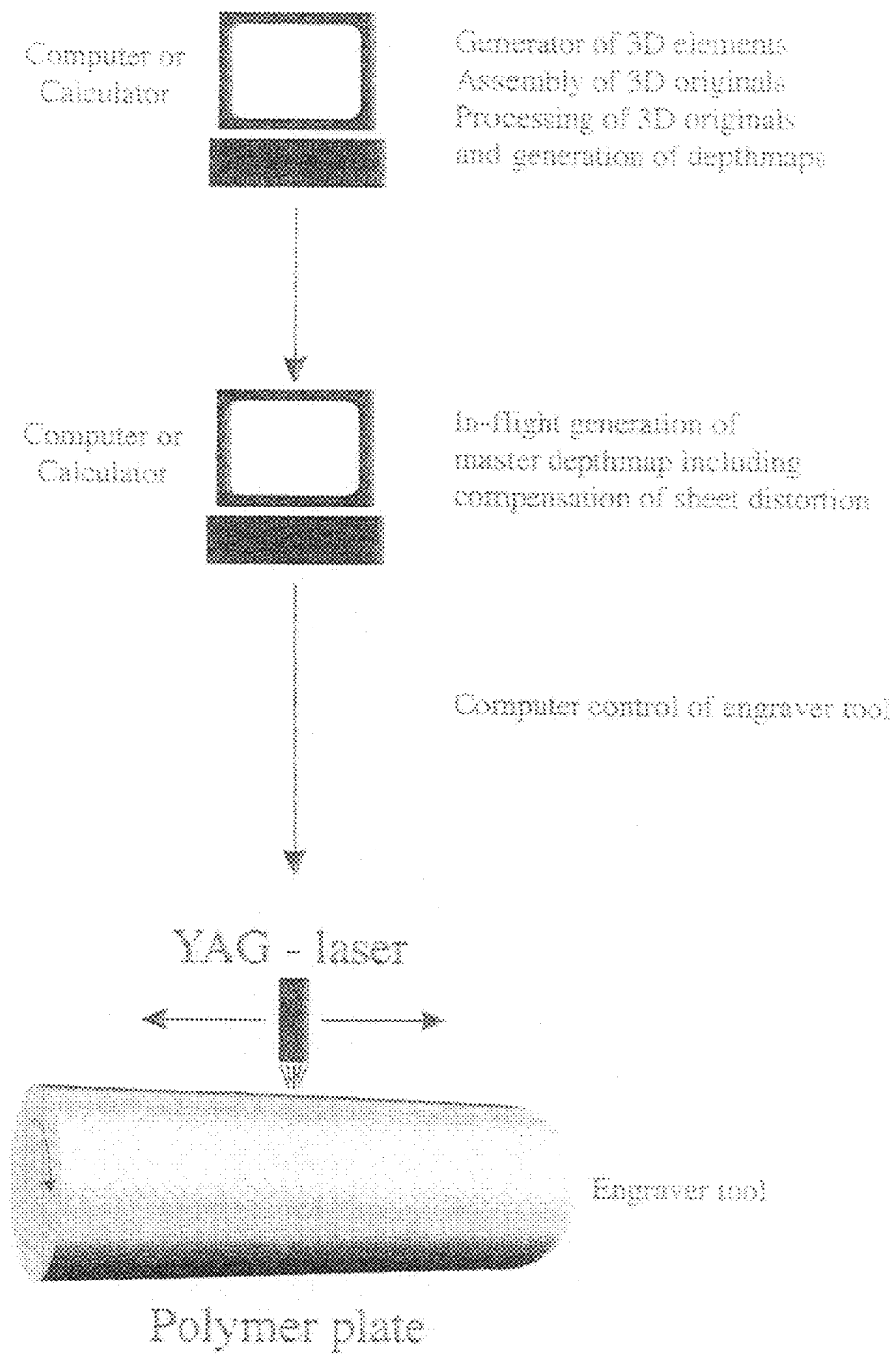

METHOD OF MANUFACTURING AN ENGRAVED PLATE

This application is a divisional application from U.S. patent application Ser. No. 10/487,026, filed Feb. 17, 2004 now U.S. Pat. No. 8,230,786 and Applicants claim foreign priority benefits under 35 U.S.C. §§119(a)-(d) or (f), or §365(b) of European Patent Application No. 02405452.0, filed Jun. 5, 2002.

The invention relates generally to the field of intaglio printing for the production of security papers, especially banknotes.

More precisely, this invention concerns a method of manufacturing an engraved plate for intaglio printing of sheets of security papers, wherein a non-engraved plate is submitted to a programmed engraving process by a computer controlled engraving tool.

Traditionally, the manufacture of intaglio plates is a long and complex process, which begins with the hand engraving of a steel or copper plate, making a copy of this first plate, adding by chemical engraving other elements, making several plastic imprints of this final original plate, welding them together, and going through an important number of galvanic bathes to obtain the final product, being the intaglio printing plate to be mounted on the machine. The whole process of plate manufacturing can take several months, and is therefore very long and costly.

EP 0 322 301 offers a slightly shortened method of manufacturing intaglio steel plates, with an electro-erosion step. First, a copper dupe of the original hand-made copper plate is obtained by electro-forming. Thereafter this dupe is used as electrode in an electro-erosion process, wherein the electrode and the steel plate, which shall be engraved, are moved one relatively to the other. Thus, this method does not circumvent the long and difficult manufacture by hand of the original plate. This method of manufacturing plates is indeed not used in the security printing industry as the plates do not have the required precision.

WO 97/48555 describes a process of the above-defined type for producing deep-drawn steel plates, which avoids the hand engraving step. Surface components are chosen in a line drawing, the edge of the surface components defining nominal outlines. From each nominal outline to which a nominal depth is allocated, a tool path is then calculated. Then an engraving tool, a laser or a chisel, is guided in such a way that a part of the surface of the plate corresponding to the various surface components is removed. A part of a surface component removed at a predetermined depth may be further deepened in a further engraving step, so that the depth of such a surface component is not necessarily constant. Nevertheless, the definition of the engraved pattern, as far as the variation of depth is concerned, is lower than the definition of the original drawing.

WO 96/26466 describes a method of manufacture of polymeric precursor plates of intaglio printing plates by photoablation which also avoids hand engraving. First, an image corresponding to the intaglio pattern is converted to a mask which has opaque and transparent portions. Light from an excimer laser forms on a polymeric workpiece an image of a region of the mask, the transparent portions corresponding to the regions which are ablated in the workpiece. The mask and the workpiece are moved so as to provide scanning of the image. Since the mask is an image merely composed of transparent and opaque portions, this method does not use information concerning variable depth, and does not provide precise control on the depths of the engravings.

DE 10044403 discloses a gravure printing method producing a half-tone image represented by irregular linear structures. In a first step an image in form of pixel data is provided and displayed by a computer. A designer analyses the image in terms of variable and various linear structures. Then, the data corresponding to the linear structures are stored in the computer in a vector based data format. In a subsequent engraving step, the vector based formated data guide an engraving tool, thus engraving an intaglio printing plate, following the data corresponding to the linear structures.

One aim of the present invention is to reduce the processing time and cost of the production of intaglio printing plates by circumventing the tedious steps of engraving vignettes and portraits by hand.

A further aim is to simultaneously maintain a high level of quality of intaglio printing plates, as traditionally manufactured, that is to say to obtain a very finely defined gravure.

A current practice in the security paper printing industry is to associate more than one printing processes on a same security paper, that is to say to submit a security paper sheet to the plurality of different printing processes so as to render forgery more difficult. As examples of other printing processes used in the security printing industry, and especially for banknotes, one can cite offset, screen printing, foil application, and numbering.

It is a known fact in the security printing industry, that the intaglio printing process causes a sheet distortion due to the high printing pressure needed to push the sheet of paper into the engravings of the printing plate. The other above-mentioned printing processes used to produce the same sheet do not cause the same distortion. As a result of this distortion, not all prints from different processes will be in register on the sheet. The term "sheet" refers here both to individual, generally rectangular sheets of paper, and to continuous strips of paper.

It is a further aim of the present invention to correct this distortion so that the prints obtained by the different involved printing processes will all be in register.

These aims are achieved by a method as defined in the introduction, wherein said programmed engraving process engraves the non-engraved plate according to the three-dimensional guiding pixel data (X, Y, Z) of a master depth-map of a said plate, wherein said master depth-map is generated by at least one computer stored original depth-map, said original depth-map comprising a three-dimensional raster image of at least a part of one said security paper, wherein an elementary engraving step is associated to each three-dimensional pixel data.

The present invention is thus based on the use of a depth-map, which is a computer file, which contains a three-dimensional raster image of the engraving, on the use of a plate as a workpiece to be engraved and on a tool receiving a depth-map information.

Preferably, the engraving tool is a laser engraving machine, and an elementary laser engraving step is associated to each pixel of the raster image. The depth of the engraving is specified by each pixel data of the raster image. Successive engraving steps may follow a pixel column of the plate, then the adjacent column, and so on. Since neighbouring oblique aligned pixels may exhibit the same depth, corresponding for example to a drawing line, the finished plate provides an image corresponding to intaglio printing, whereas the manufacturing process of the plate itself corresponds to a raster pattern.

The plate, which is engraved, may be an intaglio printing plate. The plate, which is engraved, may also be a precursor of an intaglio printing plate, which is thereafter further processed by metal depositions as known in the prior art.

The three-dimensional raster image associated to a given security paper comprises information concerning the co-ordinates (X, Y) of location of each pixel, together with a depth information (Z), associated to the same pixel.

It is obtained by processing one or several three-dimensional elements. These elements may be:
- a) three-dimensional line patterns;
- b) three-dimensional raster patterns, especially raster security patterns;
- c) three-dimensional elements composed of a number of flat areas, embedded or not, of various depths and shapes;
- d) three-dimensional scans of low relief.

Such three-dimensional line patterns may consist of strings of segments, each segment having its own specified length, width and depth.

The three dimensional raster patterns may be directly computer generated, or obtained from scanned drawings or computer designed drawings processed by an algorithm, which determines the depth of each pixel of the raster pattern. The algorithm associates a depth to each pixel so that the raster pattern is similar to line profiles observed in hand engravings.

The master depth-map provides for a plurality of repetitions of the original depth-map(s) on the engraved plate and contains information on their positions in the plane of the plate. The master depth-map thus may provide for a number of repetitions of an original depth-map according to a pattern of rows and columns.

According to a preferred embodiment of the invention, the master depth-map contains information about the sheet distortion resulting from an intaglio printing process and the parameters for the compensation of said distortion.

The master depth-map may contain permanently pixel data for the engraving of a whole plate, in particular pixel data generated according information to compensate for the sheet distortion.

The computer may also store the original depth-map(s) corresponding to one security paper and the distortion correction parameters, so that the master depth-map data are generated in flight during the engraving process, to save time and disk space.

Other particulars and advantages of the invention will further appear to those skilled in the art from the following description of a preferred embodiment, referring to the drawings, in which.

Figure 3A:
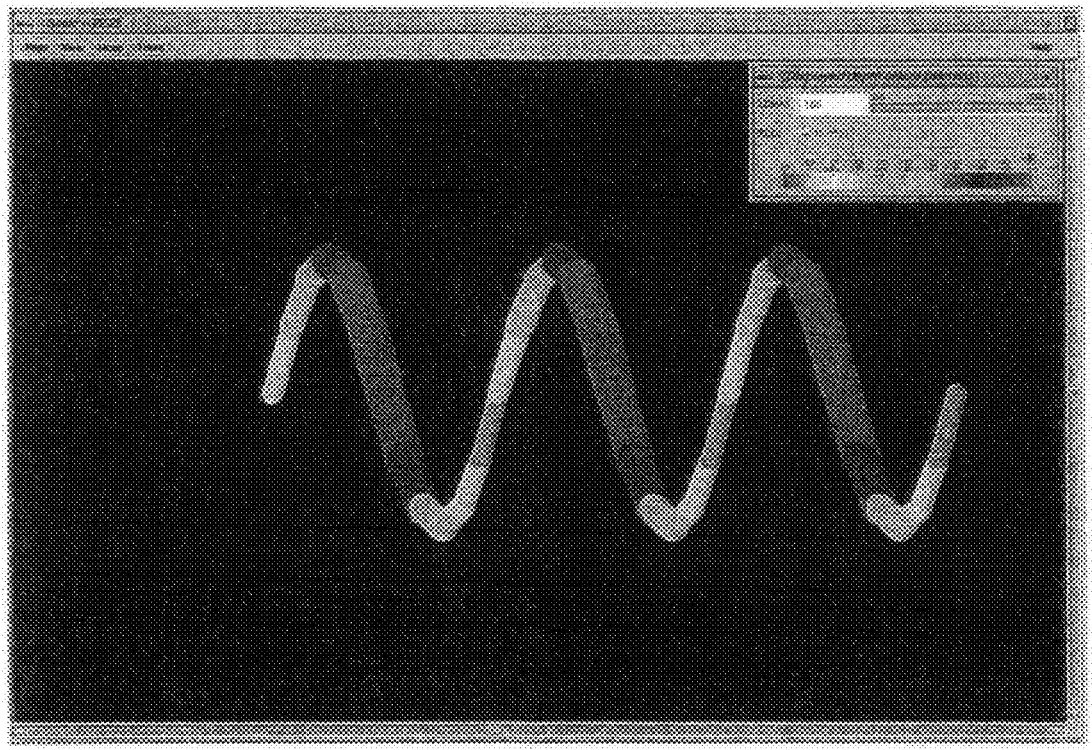
Figure 3B:
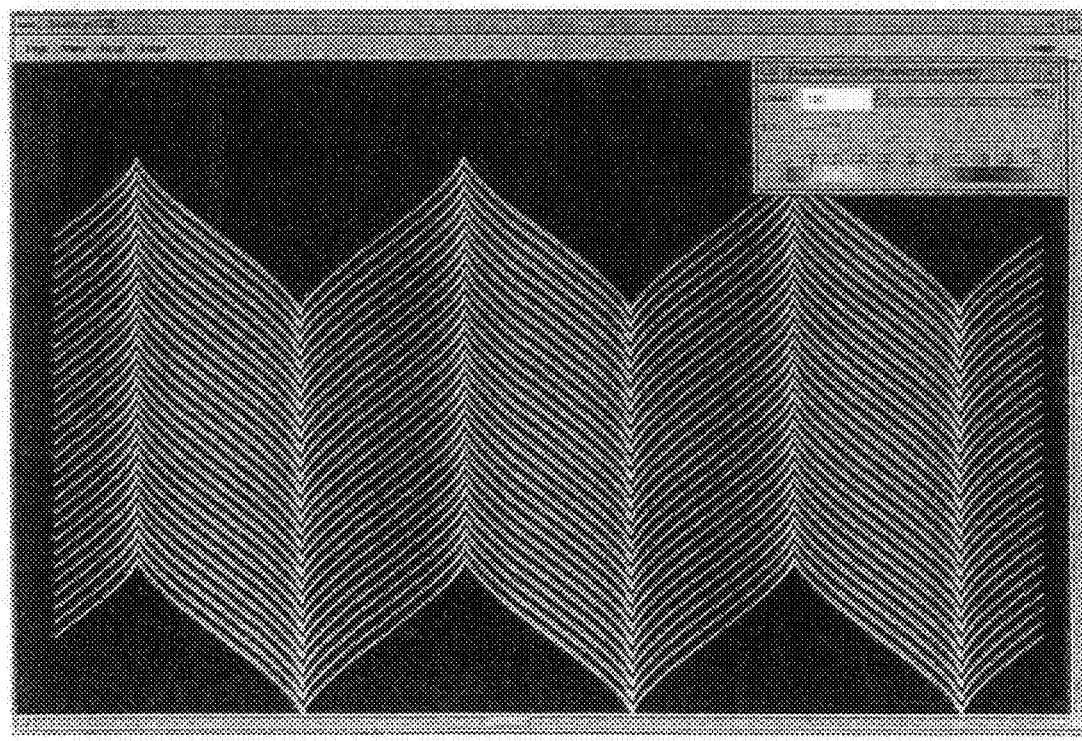

FIG. 3*a* illustrates a three-dimensional line, and FIG. 3*b* illustrates a three-dimensional line pattern.

Figure 4:
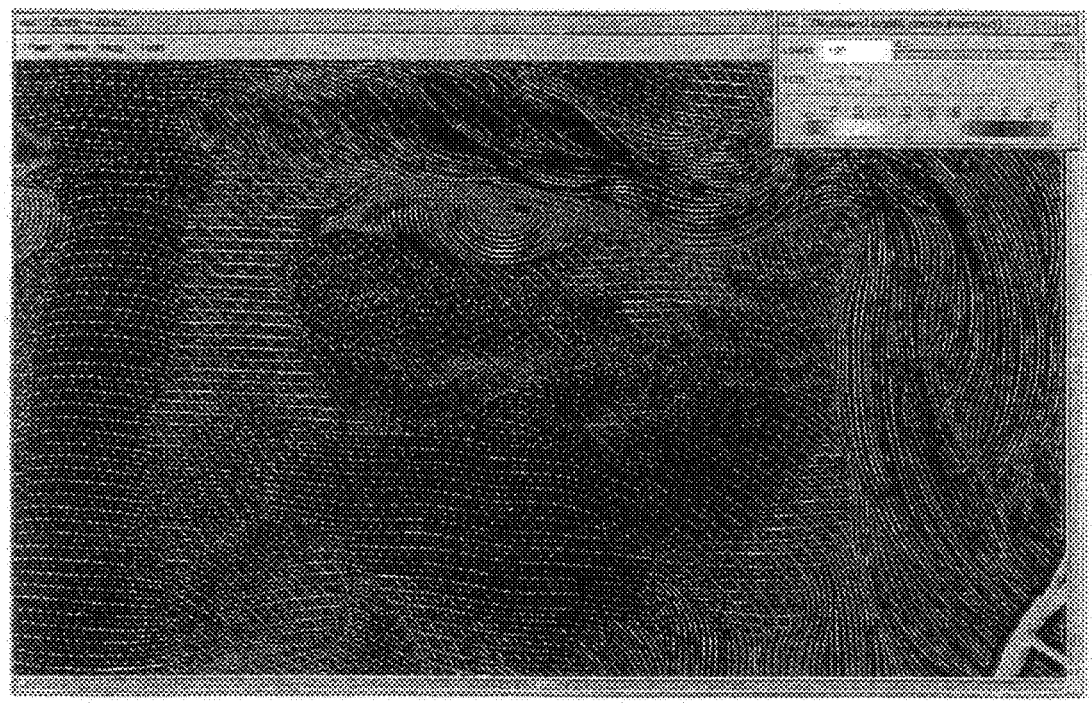

FIG. 4 illustrates a three-dimensional raster pattern.

Figure 5:
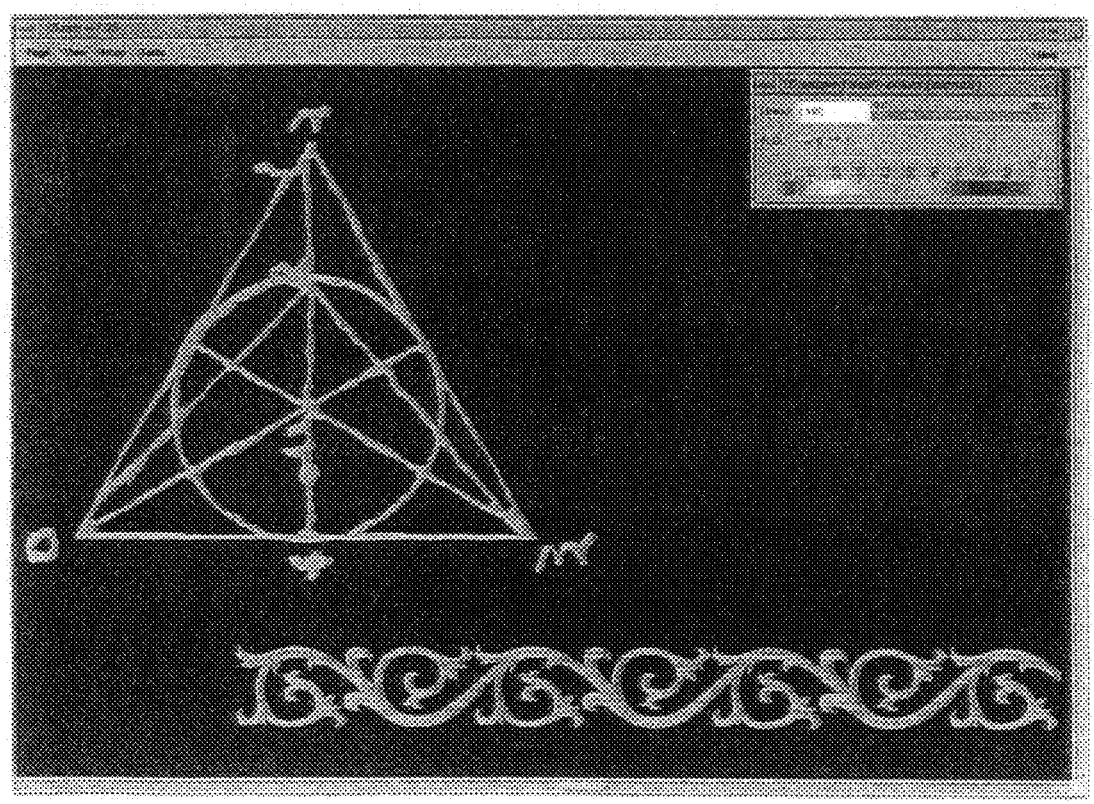

FIG. 5 illustrates other three-dimensional patterns.

Figure 6:
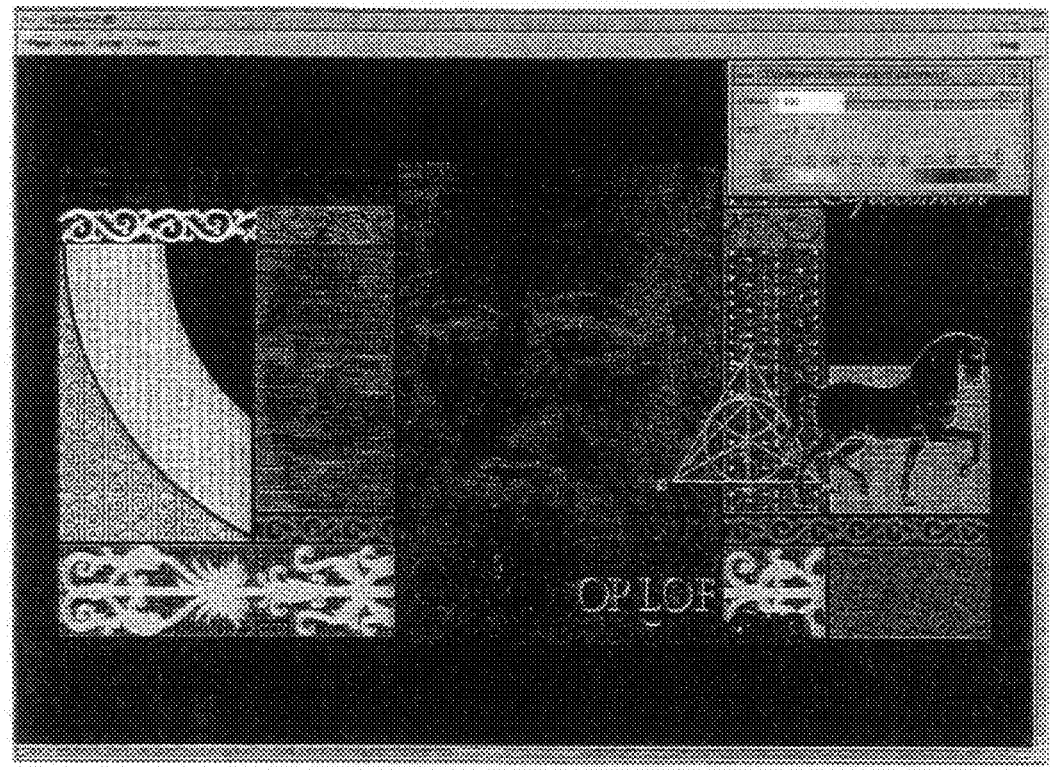

FIG. 6 illustrates a three-dimensional original depth-map.

Figure 7A:
Figure 7B:
Figure 7C:
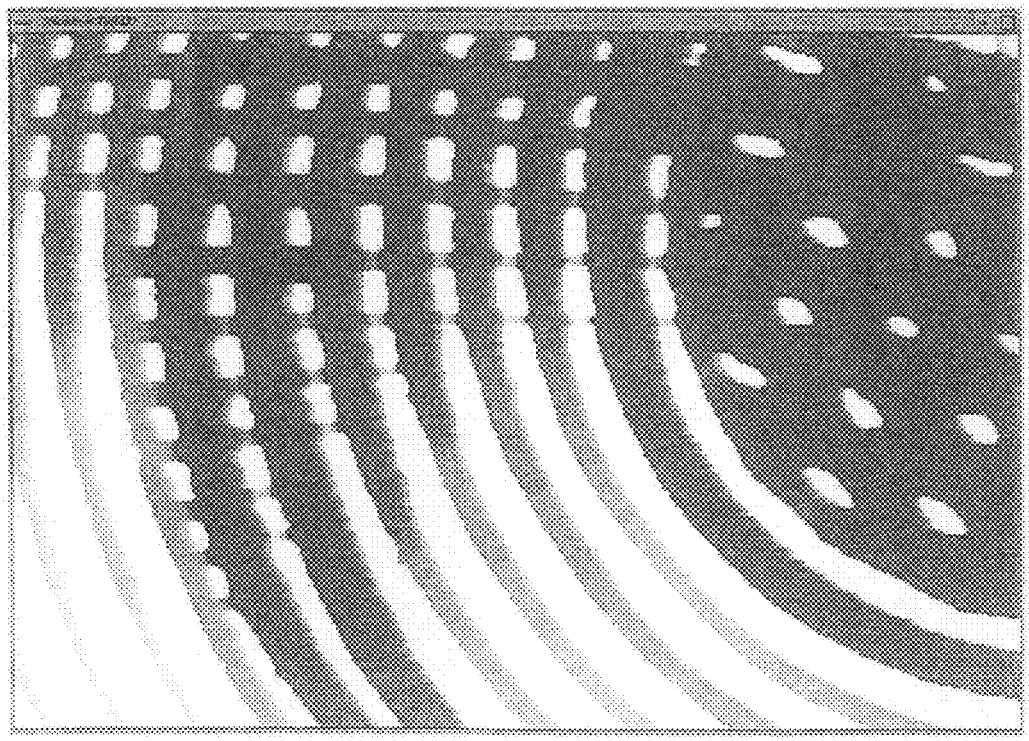

FIGS. 7*a*, 7*b*, and 7*c* illustrate an original depth-map.

Figure 8:
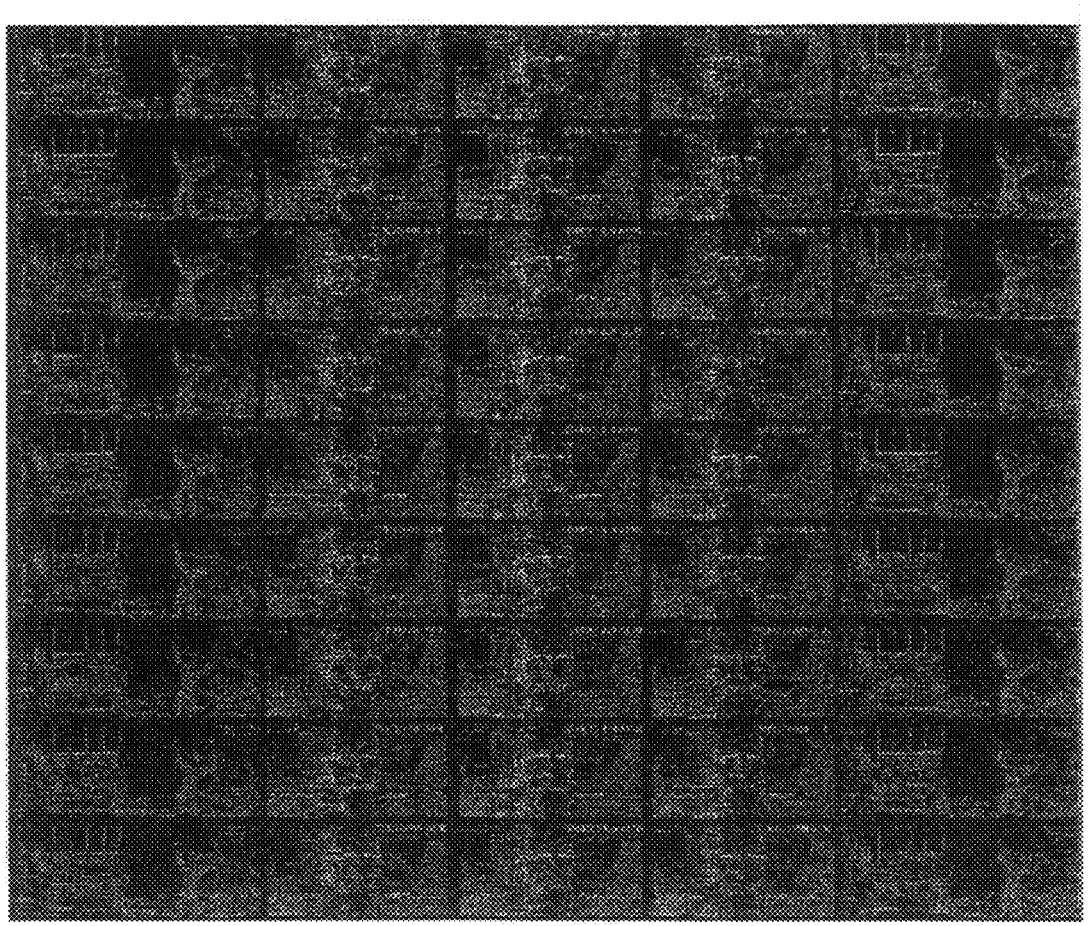

FIG. 8 illustrates a master depth-map.

FIGS. 9*a*, 9*b*, 9*c* and 9*d* illustrate embodiments of the present invention.

Figure 1:
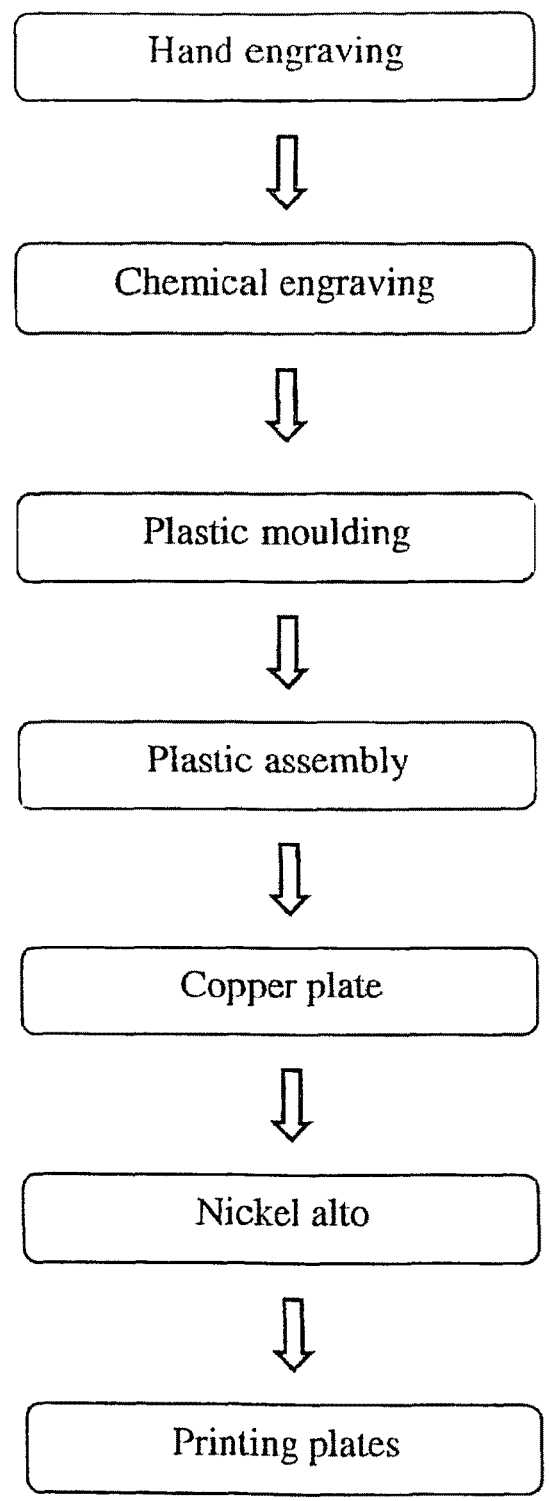
FIG. 1 illustrates schematically the state of the art method of production of intaglio plates.

FIG. 1 illustrates schematically the state of the art process traditionally used in security printing plants for the manufacture of intaglio printing plates.

The first step is the hand engraving on a steel or copper die of an image with depth, like a portrait. This step requires months of labour by a highly skilled engraver.

The second step is to make a copy of this hand engraved die, and to add by chemical engraving other lines on the die. These lines can be a computer generated security pattern to be printed during the intaglio process.

The third step is to make plastic imprints of this die. One will make as much imprints as there will be security documents printed on each sheet.

The fourth step is to cut the imprints to shape.

The fifth step is to place the said cut imprints in rows and columns, and then to weld them together, to create a multi-image plastic assembly.

The sixth step is to silver the multi-image plastic assembly.

The seventh step is to deposit on the plastic assembly a copper layer in a galvanic copper bath to produce a copper plate.

The eighth step is to deposit a nickel layer on the copper plate in a nickel plating bath.

The product resulting from all those steps in this state of the art technology is a so-called nickel-alto, which will be used as a precursor for the production of the nickel intaglio printing plates to be mounted in the intaglio presses.

Figure 2:
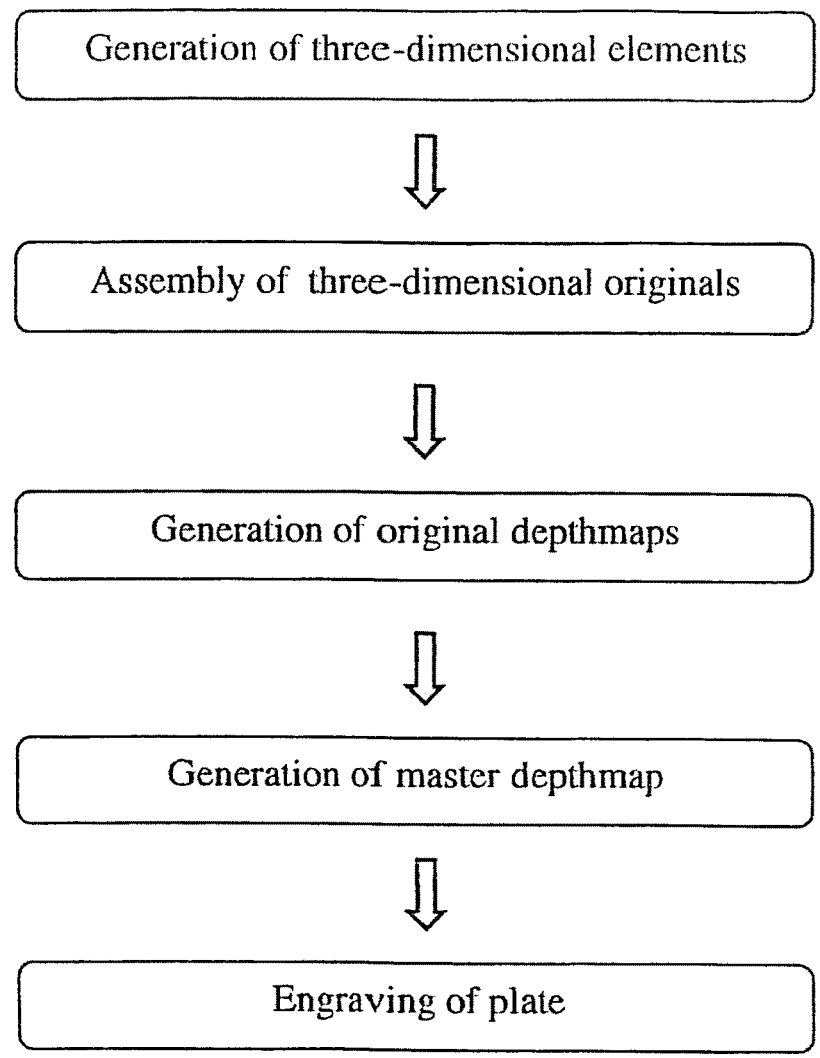
FIG. 2 illustrates schematically the method subject of this invention to manufacture intaglio plates.

FIG. 2 illustrates the main steps of the present invention, which will eliminate at least the first seven steps described in the state of the art.

The first step is to create an original depth-map which is generated as follows:

1) Generation of three-dimensional elements with depth information. These elements can be, non exclusively, of the following types:
   a. Three-dimensional line patterns. For example, these lines can be composed of strings of segments, each segment having its own specified length, width, and depth. FIG. 3*a* shows an enlarged portion of a line with variable width and depth where the depth of each segment is displayed on the computer screen by its colour, and in grey shades in this black & white printing of the screen image. FIG. 3*b* shows similarly a simple, computer generated, three-dimensional line pattern with variable width and depth.
   b. Three-dimensional security raster patterns, for example computer generated or produced from scanned hand drawings or computer-designed drawings processed by an algorithm which determines the depth of each pixel of the raster pattern according to line profiles similar to those observed in hand engravings, as illustrated in FIG. 4. For example, profiles can be selected for each line or for any group of lines. Types of profiles include, non exclusively, V-shaped and U-shaped profiles of various opening angles, as well as square-shaped profiles. The maximum depth of a line as well as the line depth-line width correlation can be specified.
   c. Other types of three-dimensional elements such as three-dimensional elements composed of a number of flat areas, embedded or not, of various depths and shapes (FIG. 5) or three-dimensional scans of low reliefs.
2. Assembly of the three-dimensional elements into an original file with depth information, as illustrated in FIG. 6.
3. Generation of an original depth-map. The processing of the original file produces a single three-dimensional raster image. FIGS. 7*a*, 7*b*, and 7*c* display the same depth-map with increasing zoom factor. The depth of each pixel is displayed by its grey level. In FIG. 7*c*, individual pixels can be seen. Their size corresponds to a-resolution of 8000 dpi.

The second step is the generation of a master depth-map which includes information on the repetition and the positions on the plate of the original depth-map, as well as information on the distortion to be applied in order to compensate the sheet distortion that occurs during printing (FIG. 8) so that all printing processes applied to a same sheet will all be in register.

The master depth-map is used by the engraving tool, which engraves the plate pixel by pixel. Laser engraving machines capable to transfer the information stored by each pixel are known to those skilled in the art.

The master depth-map data can be generated in-flight during the engraving, to save time and disk space. This is particularly useful when the master depth-map corresponds to a repetition of original depth-maps.

Those skilled in the art will understand that many variants of the depth-map generating process are feasible.

The three-dimensional elements may be assembled into more than one original file, for example several separate files for non overlapping elements. The original depth-maps generated therefrom may be repeated within the master depth-map according various rules differing from a mere repetition in rows and columns.

The assembly of superposing elements into an original file and depth-map, with a (X, Y, Z) information for each pixel, may obey to various rules, depending upon the wanted final visual effect, e.g. if one element shall locally overlie the other(s) or not.

FIGS. 9a, 9b, 9c and 9d illustrate embodiments of the present invention.

In FIG. 9a, the engraving tool is a YAG laser and the engraved plate is a polymer plate which serves as a precursor of the intaglio printing plate. The engraved plate is mounted on a rotating cylinder. The laser is moving in a direction parallel to the axis of the cylinder. The control of the laser movement and of its intensity as well as the movement of the cylinder are performed by a computer which generates in-flight the master depth-map data taking into account the compensation of the sheet deformation which occurs during the intaglio printing process.

Figure 9B:
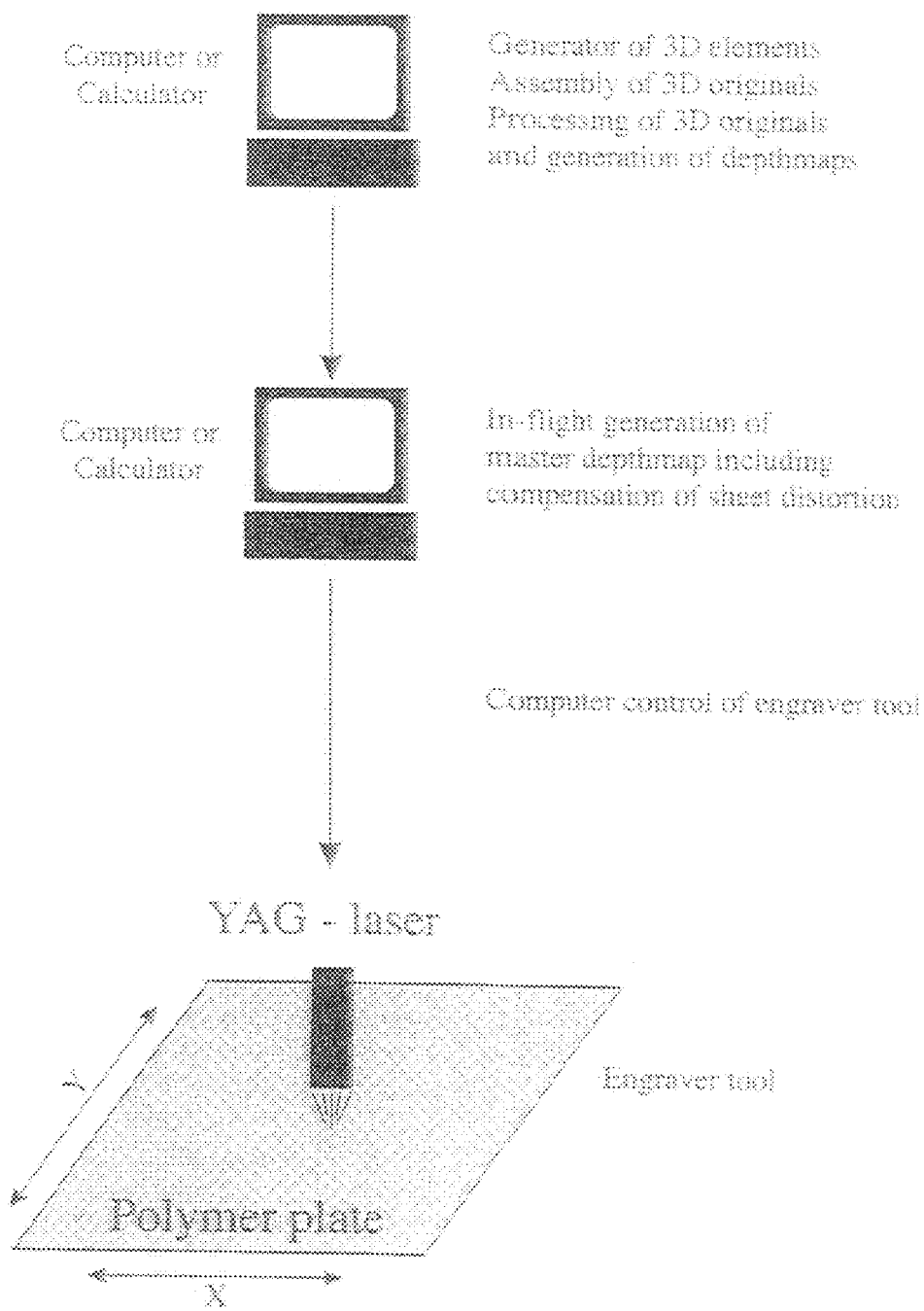

In FIG. 9b, the embodiment is similar to the one described in FIG. 9a except that the plate is mounted on a flat surface. The movements of the laser and of the plate are parallel to the plate.

Engraved polymer plates are silvered and serve as precursors of Nickel alto plates in the nickel galvanic baths.

According to a variant, the plate to be engraved is constituted of a layered structure comprising
 a metallic base plate
 an adhesive layer
 a polymer layer.

The polymer layer is engraved according to the process of the invention. Particularly suitable polymers for the engraving process are polyimides containing carbon black dispersed therein for enhancing the absorption of the laser beam. This type of material permits a particularly high definition engraving. An example of a suitable material is the carbon loaded polyimide sold under the trade name "KAPTON" by "Du Pont de Nemours".

Figure 9C:
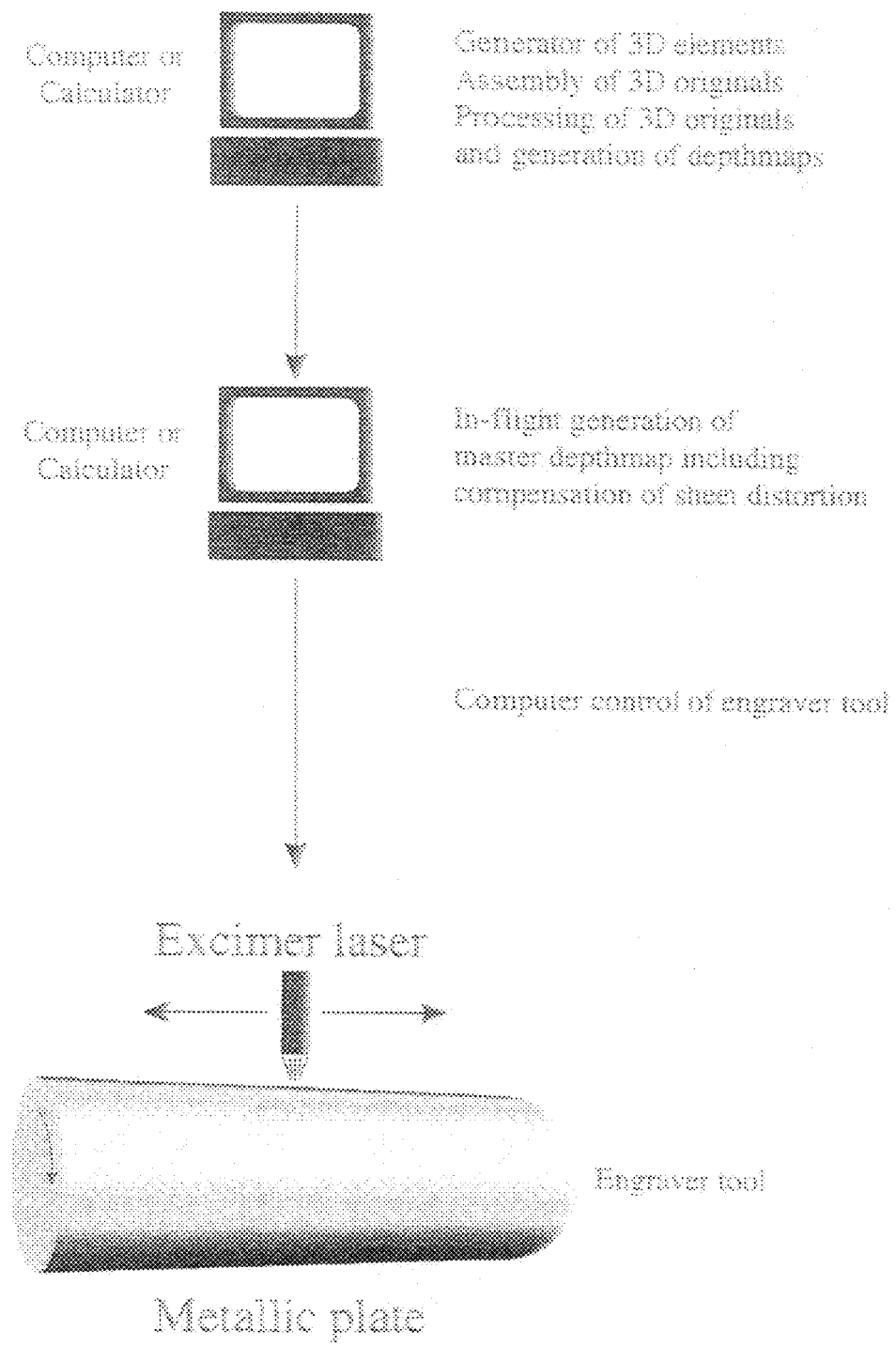

In FIG. 9c, the embodiment is similar to the one described in FIG. 9a except that the plate is metallic and that the laser is an excimer laser.

Figure 9D:
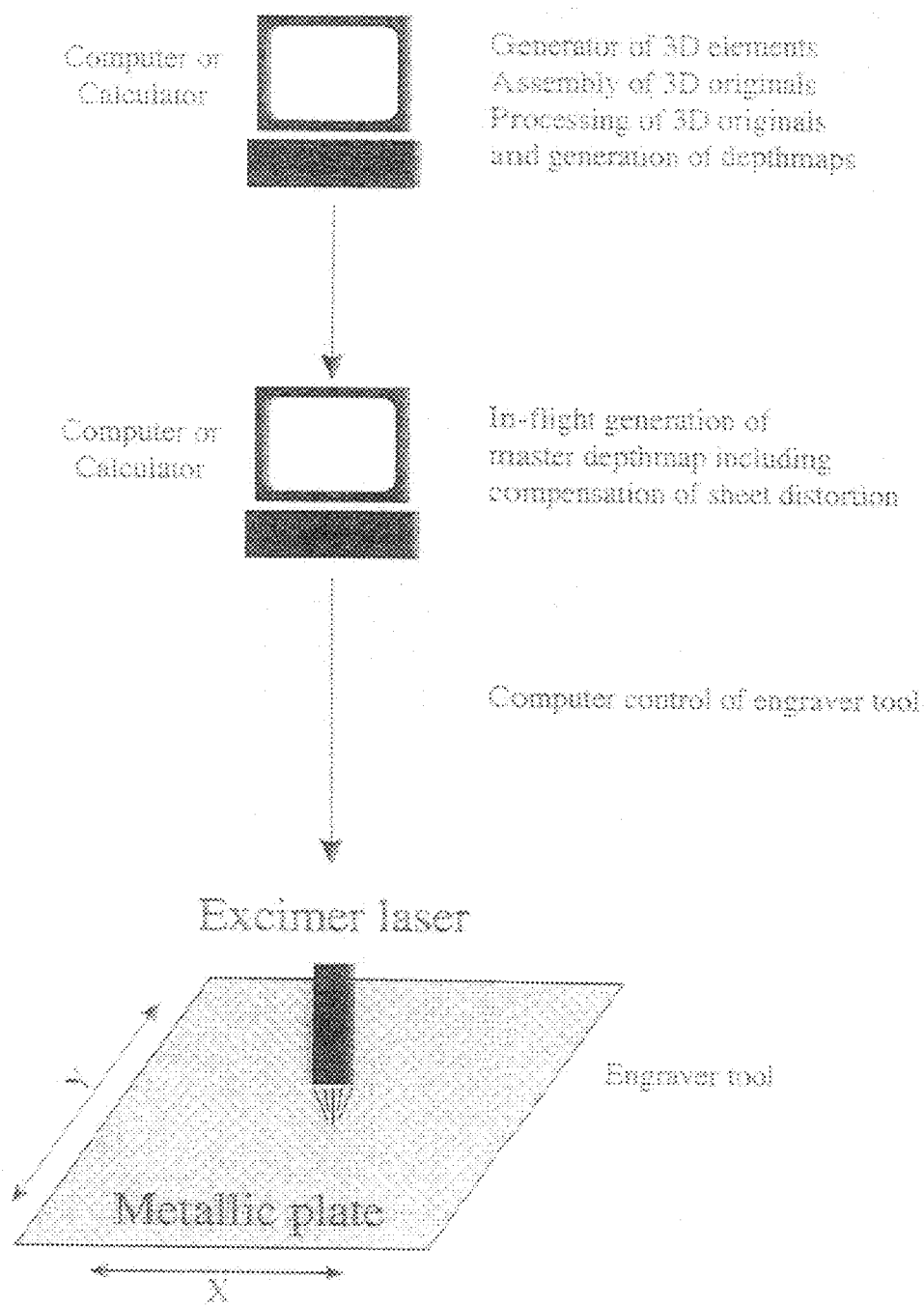

In FIG. 9d, the embodiment is similar to the one described in FIG. 9b except that the plate is metallic and that the laser is an excimer laser.

These embodiments are given only as examples and other embodiments falling under the scope of the claims may be developed by those skilled in the art. For example there may be a plurality of engraving tools guided by the master depth-map, those tools working in a synchronous way, in particular there may be as much engraving tools as there are columns of security papers on the printing sheets with said security papers.

The invention claimed is:

1. A precursor plate for the manufacture of intaglio printing plates for intaglio printing of sheets of security papers, wherein said precursor plate comprises a laser-engravable polymer layer within which engravings of various depths and shapes are to be directly engraved, said polymer layer being KAPTON, a polyimide containing dispersed carbon black material.

2. The precursor plate according to claim 1, wherein said precursor plate is designed to be mounted on a rotating cylinder of a laser engraving machine.

3. The precursor plate according to claim 1, wherein said precursor plate is constituted of a layered structure comprising the following layers:
 a metallic base,
 an adhesive layer; and
 the polymer layer.

4. Use of a precursor plate for the manufacture by laser engraving of an engraved plate for intaglio printing of sheets of security wherein said precursor plate comprises a laser-engravable polymer layer within which engravings of various depths and shapes are to be directly engraved, said polymer layer being KAPTON, a polyimide containing dispersed carbon black material.

5. A method of manufacturing an engraved plate for intaglio printing of sheets of security papers, wherein a non-engraved plate is submitted to a programmed engraving process by a computer-controlled laser engraving tool, wherein said non-engraved plate is a precursor plate according to claim 1 and wherein said polymer layer of the precursor plate is engraved by said computer-controlled laser engraving tool to form engravings of various depths and shapes directly within said polymer layer, said polymer layer being KAPTON.

6. The method according to claim 5, wherein said precursor plate further comprises a metallic base.

7. The method according to claim 5, wherein the engraved precursor plate serves as a precursor for producing a nickel alto plate.

8. The method according to claim 7, wherein the engraved precursor plate is silvered and then subjected to a nickel galvanic bath to form the nickel alto plate.

9. The method according to claim 5, wherein, during engraving, said precursor plate is mounted on a rotating cylinder of a laser engraving machine.

* * * * *

UNITED STATES PATENT AND TRADEMARK OFFICE
CERTIFICATE OF CORRECTION

| | |
|---|---|
| PATENT NO. | : 8,574,714 B2 |
| APPLICATION NO. | : 12/378544 |
| DATED | : November 5, 2013 |
| INVENTOR(S) | : Fausto Giori et al. |

It is certified that error appears in the above-identified patent and that said Letters Patent is hereby corrected as shown below:

In the Claims
- Column 6, Line 33, please delete "sheets of security wherein" and insert --sheets of security papers, wherein--.

Signed and Sealed this
Fourteenth Day of January, 2014

Michelle K. Lee
*Deputy Director of the United States Patent and Trademark Office*